(12) United States Patent
Galvin et al.

(10) Patent No.: US 11,547,044 B2
(45) Date of Patent: Jan. 10, 2023

(54) FRONT MOWER FOR MOUNTING ON A FRONT THREE POINT LINKAGE OF A TRACTOR

(71) Applicant: IDOUGH INVESTMENT COMPANY, Bagenalstown (IE)

(72) Inventors: John Galvin, Bagenalstown (IE); Con Hourihane, Bagenalstown (IE); Enda Lacey, Bagenalstown (IE); Adrian Lacey, Bagenalstown (IE)

(73) Assignee: IDOUGH INVESTMENT COMPANY, Bagenalstown (IE)

( * ) Notice: Subject to any disclaimer, the term of this patent is extended or adjusted under 35 U.S.C. 154(b) by 56 days.

(21) Appl. No.: 17/285,117

(22) PCT Filed: Oct. 15, 2019

(86) PCT No.: PCT/EP2019/077917
§ 371 (c)(1),
(2) Date: Apr. 14, 2021

(87) PCT Pub. No.: WO2020/078976
PCT Pub. Date: Apr. 23, 2020

(65) Prior Publication Data
US 2021/0352844 A1 Nov. 18, 2021

(30) Foreign Application Priority Data
Oct. 15, 2018 (GB) ..................................... 1816752

(51) Int. Cl.
*A01D 34/66* (2006.01)
*A01B 63/11* (2006.01)
(52) U.S. Cl.
CPC ............ *A01D 34/662* (2013.01); *A01B 63/11* (2013.01)

(58) Field of Classification Search
CPC ............................. A01D 34/662; A01B 63/11
See application file for complete search history.

(56) References Cited

U.S. PATENT DOCUMENTS

| 1,372,339 A | 3/1921 | Cook |
| 2,812,630 A | 11/1957 | Elfes |
| (Continued) | | |

FOREIGN PATENT DOCUMENTS

| EP | 3251482 A1 | 12/2017 |
| FR | 2573277 A1 | 5/1986 |
| (Continued) | | |

OTHER PUBLICATIONS

International Search Report and Written Opinion in PCT/EP2019/077917 dated Jan. 14, 2020.

(Continued)

*Primary Examiner* — Abigail A Risic
(74) *Attorney, Agent, or Firm* — Schmeiser, Olsen & Watts LLP; Timothy P. Collins, Esq.

(57) ABSTRACT

A front mower for mounting on a front three point linkage of a tractor to be operated for cutting vegetation, such as grass, in front of the tractor, the mower comprising: (i) a headstock for mounting on the front three point linkage of the tractor; (ii) a mowing head comprising an array of cutting heads for cutting vegetation such as grass, mounted on and moveable relative to the headstock to follow the contours of the ground over which the mower is passing; (iii) a mounting mechanism mounting the mowing head to the headstock, wherein the mounting mechanism comprises a cutting angle adjustment mechanism comprising an arc shaped guide and a follower for the arc shaped guide, the follower being moveable back and forth along the arc shaped guide, so that the cutting angle adjustment mechanism allows the mowing head to move back and forth along an arc defined by the guide and relative to the headstock so (Continued)

as to vary the cutting angle of the cutting heads. This allows for free movement of the mowing head to follow the contours of the ground.

20 Claims, 8 Drawing Sheets

(56) References Cited

U.S. PATENT DOCUMENTS

| | | | | |
|---|---|---|---|---|
| 4,310,997 | A * | 1/1982 | Streicher | A01B 59/042 |
| | | | | 56/15.9 |
| 4,848,069 | A * | 7/1989 | Ermacora | A01D 34/38 |
| | | | | 56/15.8 |
| 4,936,391 | A * | 6/1990 | Cameron | A01B 33/06 |
| | | | | 172/111 |
| 6,854,250 | B2 * | 2/2005 | Boyko | A01D 34/66 |
| | | | | 56/14.9 |
| 10,681,853 | B2 * | 6/2020 | McHale | A01B 63/14 |
| 2003/0146006 | A1 * | 8/2003 | Coenen | A01B 33/085 |
| | | | | 172/779 |
| 2006/0150604 | A1 * | 7/2006 | Kieffer | A01B 63/10 |
| | | | | 56/15.8 |
| 2006/0288679 | A1 | 12/2006 | Wright | |
| 2018/0139888 | A1 * | 5/2018 | McHale | A01B 59/066 |
| 2019/0327880 | A1 * | 10/2019 | van Kester | A01B 63/1006 |
| 2020/0267886 | A1 * | 8/2020 | Simpson | A01D 69/002 |

FOREIGN PATENT DOCUMENTS

| | | |
|---|---|---|
| WO | 9931961 A1 | 7/1999 |
| WO | 03005799 A2 | 1/2003 |

OTHER PUBLICATIONS

Combined Search and Examination Report in UK Patent Application No. GB1816752.8 dated Apr. 12, 2019.

* cited by examiner

FRONT MOWER FOR MOUNTING ON A FRONT THREE POINT LINKAGE OF A TRACTOR

FIELD OF THE INVENTION

The present invention relates to a front mower for mounting on a front three point linkage of a tractor.

BACKGROUND TO THE INVENTION

The present invention relates to a mower for front mounting on a tractor for example to a front linkage of a tractor. Often such a mower forms part of a group or gang of mowers. For example a tractor may have one or more, for example two or more, rear mowers that are mounted so that together the gang of mowers cut a continuous area without leaving any uncut strip in the continuous area.

The one or more rear mowers may be mounted on a rear three point linkage of a tractor. Alternatively they may be trailed, for example they may be trailed on a frame which runs (on wheels) behind the tractor.

Typically the front mower runs in the middle and the rear mower(s) is/are offset to either side of the front mower. Such a set-up is of interest in the present invention, in particular an arrangement where there is one front mower and two rear mowers forming a gang of three mowers that cut a continuous area without leaving any uncut strip in the continuous area.

In some mowers, rotating cutting discs run along the ground, for example sitting on a drum plate. In other cases a cutting bar runs along the ground. Typically this is a sliding or skid action. In all cases it is desirable that the mower follows the contours of the ground insofar as possible to ensure that the mower does not get caught in raised ground and does not cut at a high level where there is a hollow.

In use, a mower can get caught on an obstacle such as a raised piece of ground, or a foreign object such as a rock, strong vegetation such as a bush or tree etc. This is particularly the case where the obstacle or foreign object catches in one place on the mower.

For rear mowers such as a trailed mower a break-away mechanism is sometimes provided that allows the mower to move relative to the tractor in the event that the mower gets stuck but the tractor continues moving. For example, the breakaway mechanism may allow the mower to swing back relative to the tractor by pivoting on a mounting frame when a threshold force is exceeded. Without such mechanisms, serious damage can be caused to the mower and/or the tractor if the mower gets stuck against an obstacle but the tractor keeps moving.

Furthermore it may be easier for a rear mower to follow the contours of the ground because it is mounted on the tractor or a mounting frame and runs behind the tractor. In such a case for example on raised ground the tractor moves over the raised ground before the mower does and this can mean the mower is less likely to get stuck as it follows the motion of the tractor. On the other hand, a front mower leads the motion of the tractor, and a front mounted mower could be pushed into an obstacle such as raised ground so it is more likely to get stuck against an obstacle. Also because the font mower is mounted to the front and centre of the tractor, it is not usually possible to allow the mower to allow a break away action such as allowing the mower to swing back as to do so would allow it to catch against the tractor thus causing damage.

Typically the front mower experiences higher stress forces because it is pushed along the ground than it would if pulled behind a tractor.

For this reason it is desirable that the front mower has a high degree of freedom of movement to ensure it can deal with contours experienced in use.

For example it is known to provide a front mower with a frame or headstock that mounts it to the tractor that allows the cutting head to hang freely thus allowing for freedom of movement of the cutting head of the mower.

It will be appreciated that as the mower is quite heavy itself that the drag on the ground would be very significant if the full weight of the mower has to be pushed along the ground.

For this reason it is known to use a suspension unit that may be built into the headstock to take at least part of the weight and transfer it to the tractor (via a front three point linkage) when the mower is lowered for use to cut, for example even when partially resting on the ground. This may be done with a hydraulic system built into the headstock which may have an automatic control system which will allow a selected amount of the weight of the mower to be transferred to the tractor, using the hydraulic system and via the three point linkage.

In other instances the tractor three point linkage system is arranged to take at least part of the weight and transfer it to the tractor when the mower is lowered for use to cut, for example even when touching the ground. In such a case a control system of the tractor may be used to automatically control the weight of the mower taken by the tractor.

Systems which take up a partial weight of an implement are often called a float or floating system.

For example Kuhn has a front mower (model FC 3125 F) that is shown here: https://www.youtube.com/watch?v=E6ZHLzzS51g. Claas make a front mower (model Disco 3500 FC) which is found here https://youtu.be/tFkssdGYMtA. Both incorporate titling systems to allow the cutting head to follow the contours of the ground as closely as possible. In both cases part of the weight of the mower is transferred to the tractor using a floating system.

Notwithstanding the arrangements that have been used to provide a front mower that follows the ground contours as closely as possible it is desirable to provide a front mower that is robust in use and that will follow the contours of the ground.

SUMMARY OF THE INVENTION

In one aspect, the present invention provides a front mower for mounting on a front three point linkage of a tractor to be operated for cutting vegetation, such as grass, in front of the tractor, the mower comprising:
  (i) a headstock for mounting on the front three point linkage of the tractor;
  (ii) a mowing head comprising an array of cutting heads for cutting vegetation such as grass, mounted on and moveable relative to the headstock to follow the contours of the ground over which the mower is passing;
  (iii) a mounting mechanism mounting the mowing head to the headstock, wherein the mounting mechanism comprises a cutting angle adjustment mechanism comprising an arc shaped guide and a follower for the arc shaped guide, the follower being moveable back and forth along the arc shaped guide, so that the cutting angle adjustment mechanism allows the mowing head to move back and forth along an arc defined by the guide and relative to the headstock so as to vary the cutting angle of the cutting heads.

This is a very simple arrangement which allows very good articulation of the mowing head relative to the headstock. The mowing head follows the ground utilising a ground engaging member such as a skid. The articulation allows for the mowing head to closely follow the contours of the ground without being impeded by the headstock. It also means that the mowing head is less likely to get caught in an obstacle such as rising ground in front of the mower. It allows for the cutting angle of the cutting heads relative to the ground to vary. The plane of the arc shaped guide(s) is parallel to the direction of travel. The centre of curvature of the arc of the arc shaped guide(s) is below the arc shaped guide in a perpendicular plane.

Desirably the front mower of the present invention further includes biasing means for biasing the mowing head towards a predetermined position along the arc shaped guide for example a position where the cutting heads are tilted up relative to a horizontal plane. This means that the default position of the mowing head can be controlled without the requirement for any external controlling mechanisms such as an actuator etc. as otherwise it is a free moving mechanism where the follower is moveable freely back and forth along the arc shaped guide. The biasing means nonetheless allows the mowing head to freely change angle in response to changes in terrain. There are no positional controls on the movement of the follower relative to the arc shaped guide.

Desirably the centre of curvature of the arc is coincident with or proximate to the cutting heads so that back and forth movement along the arc is translated into a tilting motion of the cutting heads about an axis through the centre of curvature. This means that the axis about which the cutting head tilts, is that same axis. It may be an axis proximate to the centre of curvature of the arc. This means that the tilting back and forward of the coupling head is easily achieved. Furthermore it means that the pivot point which allows the tilting back and forward is remote from the cutting head. The pivot point which allows the tilting back and forward is located above the cutting head. This contrasts with other arrangements where the cutting bed itself is pivoted within the mowing head.

Desirably the centre of curvature of the arc is below the cutting heads so that the back and forth movement along the arc is translated into a tilting motion of the cutting heads about an axis through the centre of curvature. Again this contributes to ease of movement of the entire cutting head relative to the headstock to which it is mounted.

Suitably the headstock includes a tilting mechanism that allows side to side tilting of the mounting mechanism thus allowing side to side tilting of the mowing head. the tilting mechanism balances the mowing head at all tilt angles of the side to side tilting so that the mowing head remains at a given tilt angle. This means that not only can the mowing head tilt back and forward it can also tilt side to side. To assist with such balancing one or more tension springs can extend between the mowing head and the headstock, for example on left and right sides of the mowing head.

The headstock may comprise a support that connects to, and when connected is fixed relative to, the three point linkage of the tractor, and the headstock further comprises:
  (i) an upper linkage arm that extends from the support;
  (ii) a lower linkage arm that extends from the support;
  the upper linkage arm extending from the support at a position above the lower linkage arm, and wherein the upper and lower linkage arms together connect the mounting mechanism to the support.

The upper linkage arm forms part of the tilting mechanism by moving in response to side to side tilting of the mounting mechanism.

The side to side tilting of the mower head is interconnected with the main lifting linkage mechanism though the upper linkage arm. The compressive forces in this upper linkage arm influences the tilting motion of the mowing head and encourages the mowing bed to maintain a side to side tilted position counteracting its natural tendency to hang down in the level position.

This is achieved by allowing the upper linkage arm move in both the vertical and horizontal planes so when the mower bed tilts from side to side the upper linkage arm is allowed to follow.

The mounting mechanism, for example a mounting bracket, is attached to the lower linkage arm optionally by two pinned joints arranged on perpendicular axes. This allows for two degrees of freedom between the mounting mechanism and the lower linkage arm. The overall benefit of this system is that if the mower bed needs to tilt side to side as required by the ground conditions there is very little resistance to doing so.

The mounting mechanism may comprise a mounting bracket that attaches the cutting angle adjustment mechanism to the headstock. For example the mounting mechanism may comprise a mounting bracket that extends upwards from the cutting angle adjustment mechanism and attaches the cutting angle adjustment mechanism to both the lower linkage arm and the upper linkage arm. Again this contributes to a simplicity of construction and to desirable movement of the mowing head to follow the contours of ground over which it passes.

The mounting bracket may be connected to the lower linkage arm so as to allows side to side tilting of the mowing head and is connected to the upper linkage arm so as to allows side to side tilting of the mowing head.

Desirably the lower linkage arm is a continuous arm that connects to the support on a left hand side and extends forwardly away from the support to a position where it is above the mowing head and then returns to connect to the support on a right hand side thereof.

A front mower of the invention may further comprise a transfer box which has a coupling or shaft to be driven by a tractor power take off (pto) shaft and also a coupling or shaft for at least one mower pto shaft for driving the cutting heads and the transfer box transfers power from the tractor pto shaft to the mower pto shaft.

The transfer box may be mounted on the mounting bracket or on the lower linkage arm. Desirably the lower linkage arm carries the transfer box.

Suitably the mounting mechanism comprises at least one arc shaped channel and at least one roller that runs within the guide optionally wherein the roller is a roller bearing.

A front mower of the invention runs along the ground, optionally in a condition where part of the weight of the front mower is taken up by the tractor to which it is attached. For example it may have at least one skid such as an adjustable skid for running along the ground to follow the contours of the ground. Such skids allow the cutting heads to closely follow the contours of the ground over which they move, thereby ensuring a consistent cutting height.

Desirably the skid has an increasing ground contact surface area from a forward end thereof toward a rearward end thereof. This increases the footprint and reduces ground pressure. A forward end of the skid is desirably pivotably connected to the mowing head, for example proximate the cutting heads.

Suitably the skid is adjustable to vary the cutting angle of the cutting heads.

A forward end of the skid may extend to a position beneath the cutting heads.

The headstock may incorporate a suspension that takes at least part of the weight of the mower and transfers it to the tractor, optionally wherein the suspension is controlled by an electronic controller.

BRIEF DESCRIPTION OF THE DRAWINGS

Embodiments of the invention will be described, by way of example only, with reference to the accompanying drawings in which.

DETAILED DESCRIPTION OF THE DRAWINGS

Figure 1:
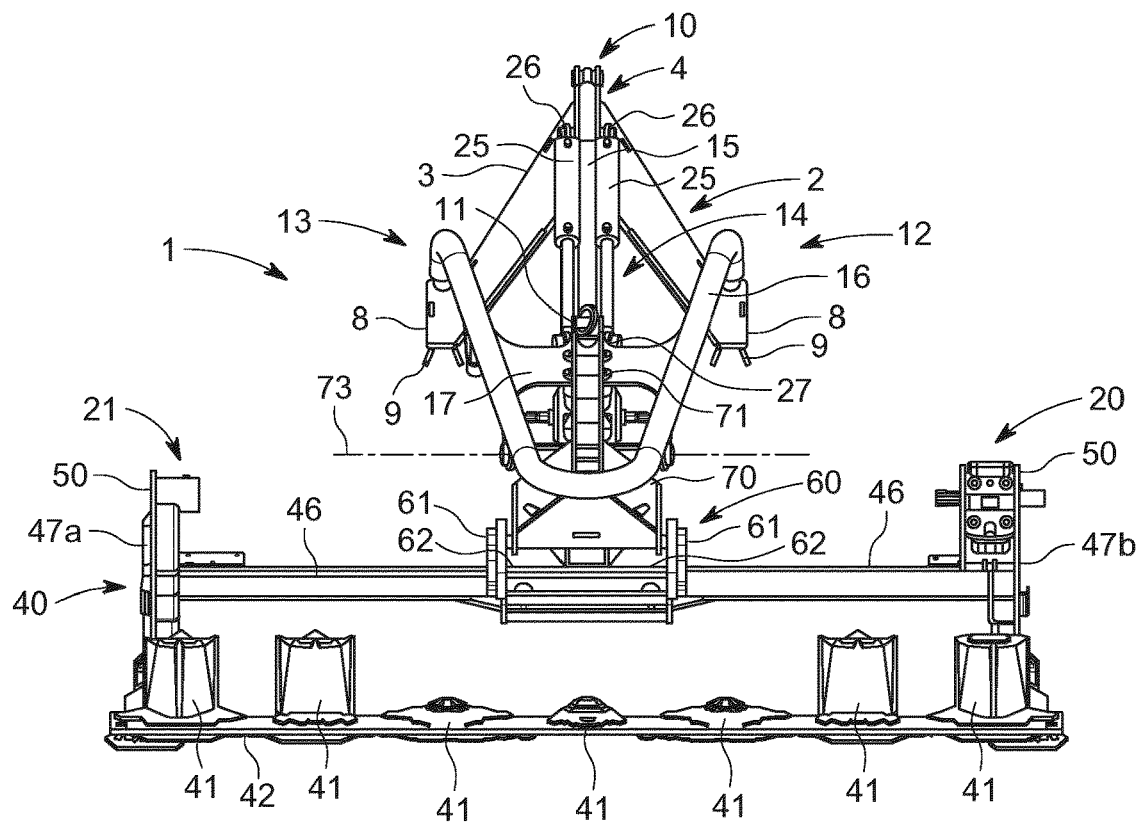
FIG. 1 is a front view of a front mower of the present invention.

For the purposes of the present invention the Applicant's adopt the following terminology.

"Left" and "right" are relative to the direction of travel, as viewed by a person behind the front mower, such as a person driving a tractor on which the front mower is mounted, and looking towards/across the front mower. The left hand side is on the left side of that person. The right hand side is on the right side of that person.

"Forward" or "front" and "rear or back" are relative to the direction of travel, as viewed by a person behind the front mower, such as a person driving a tractor on which the front mower is mounted, and looking towards/across the front mower. The forward or front part of the mower is the leading part in the direction of travel (when moving forward). The rear of the mower is the trailing part (in the direction of travel (when moving forward)) typically the part attached to the front of the tractor.

If the mowing head has moved out of a horizontal plane so that the left hand side is higher than its right hand side or vice versa this will be referred to as side to side tilting and referred to as the tilt angle.

If the mowing head has moved out of a horizontal plane so that the front of the mowing head is higher than its rear or vice versa this will be referred to as front or forward and rear tilting. The "cutting angle" is the cutting angle of the mowing heads relative to a horizontal plane, and the cutting angle is due to a position in which they are set within the mowing head and/or due to forward and rear tilting of the mower. For the purposes of the present invention side to side tilting is not considered to adjust the cutting angle. Only forward or rear tilting changes the cutting angle as the machine moves over the ground. In the present invention the arc shaped guide(s) are arranged parallel to the direction of travel. The arc shaped guide(s) describe the travel of the mowing head for forward and rear tilting of the mowing head.

A front mower 1 to be operated for cutting vegetation, such as grass, is shown in FIGS. 1 to 15. The front mower 1 is for mounting on a front three point linkage of a tractor (not shown). The front mower runs along the ground and follows the contours of the ground for example by use of one or more skids.

The front mower 1 comprises a headstock 2 for mounting on the front three point linkage of a tractor.

The headstock 2 comprises a support 3 that is connected to and fixed relative to the three point linkage of the tractor.

The front mower 1 comprises a mowing head 40 comprising an array of cutting heads 41 for cutting vegetation such as grass. The cutting heads 41 are mounted on a common carrier which may take the form of a cutting bed 42. The cutting head are mounted for powered rotation from a front power-take-off (pto) shaft of the tractor. The mowing head 40 is mounted on and moveable relative to the headstock 2 to follow the contours of the ground over which the front mower 1 is passing.

It will be appreciated that, in use, and for health and safety reasons, it is desirable that the mowing head is enclosed by one or more covers and or skirts as is conventional for mowers. The covers/skirts prevent accidental contact with the moving heads and also prevents cut material, and objects sent flying by the mowing heads, (such as pieces of hard material such as sticks or stones) being shot out of the machine.

Figure 6:
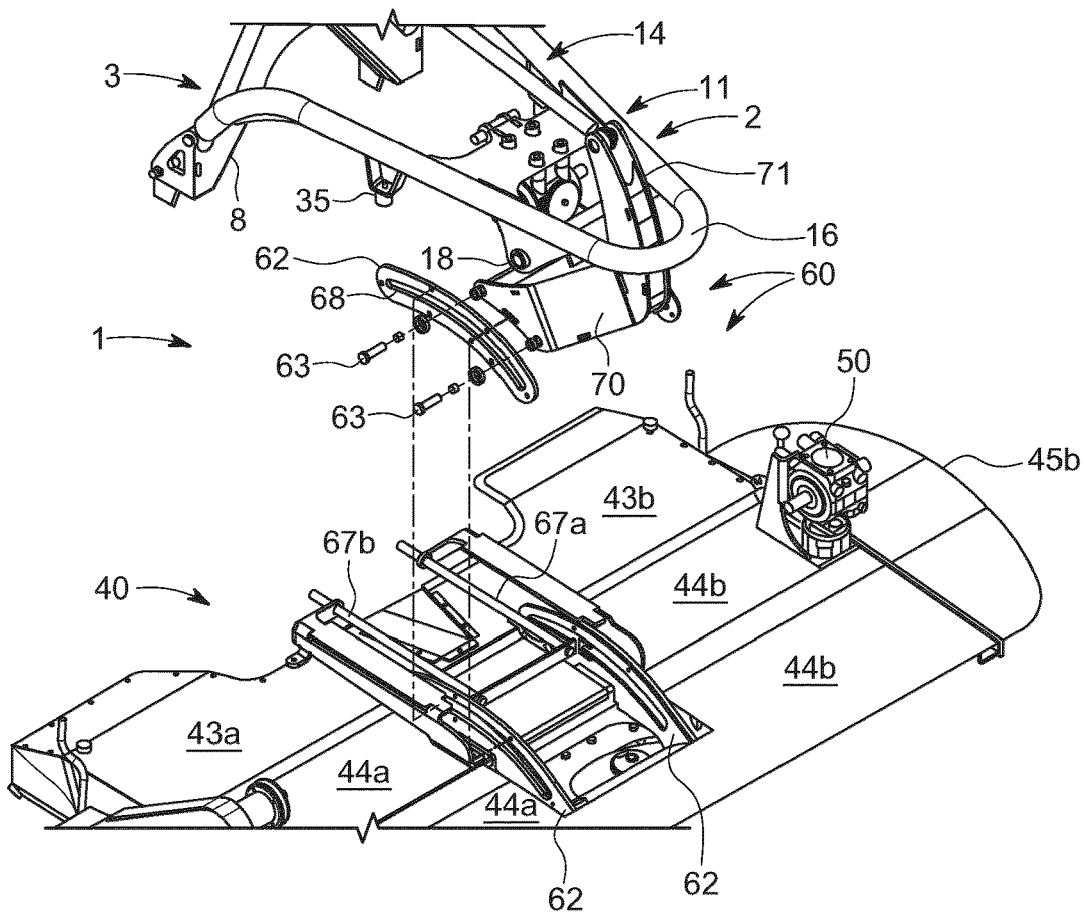
FIG. 6 is a front part exploded view of the front mower of FIG. 1.
Figure 7:
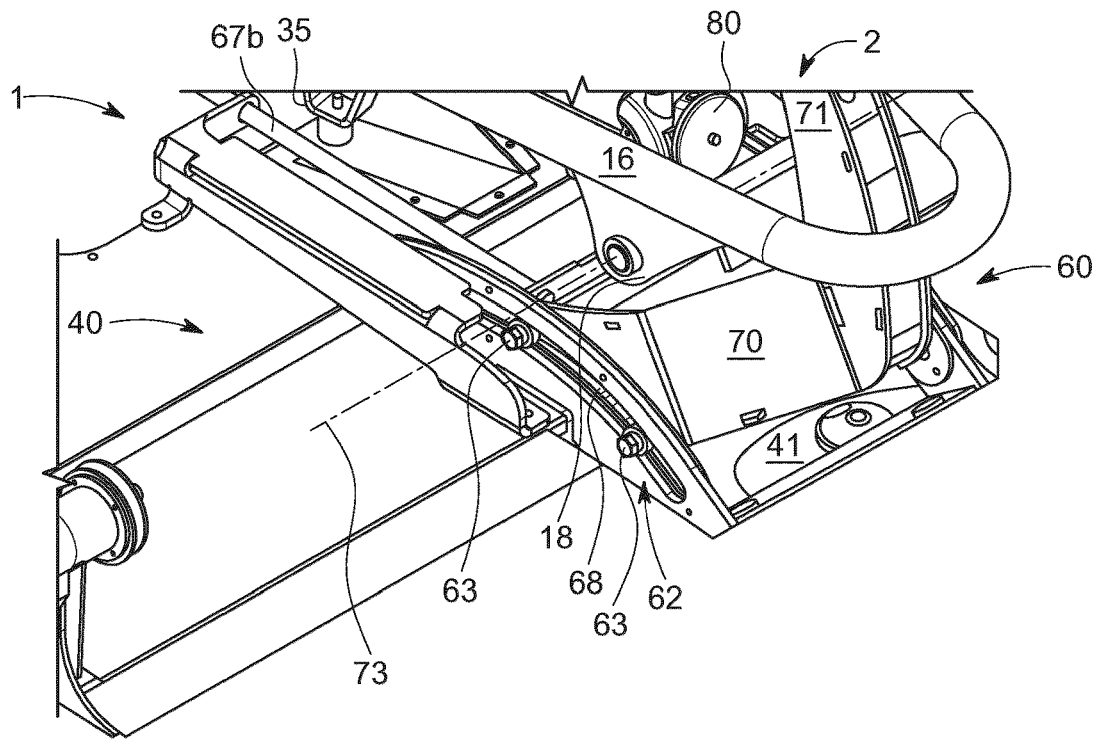
FIG. 7 is a side perspective enlarged partial view of the front mower of FIG. 1.
Figure 8:
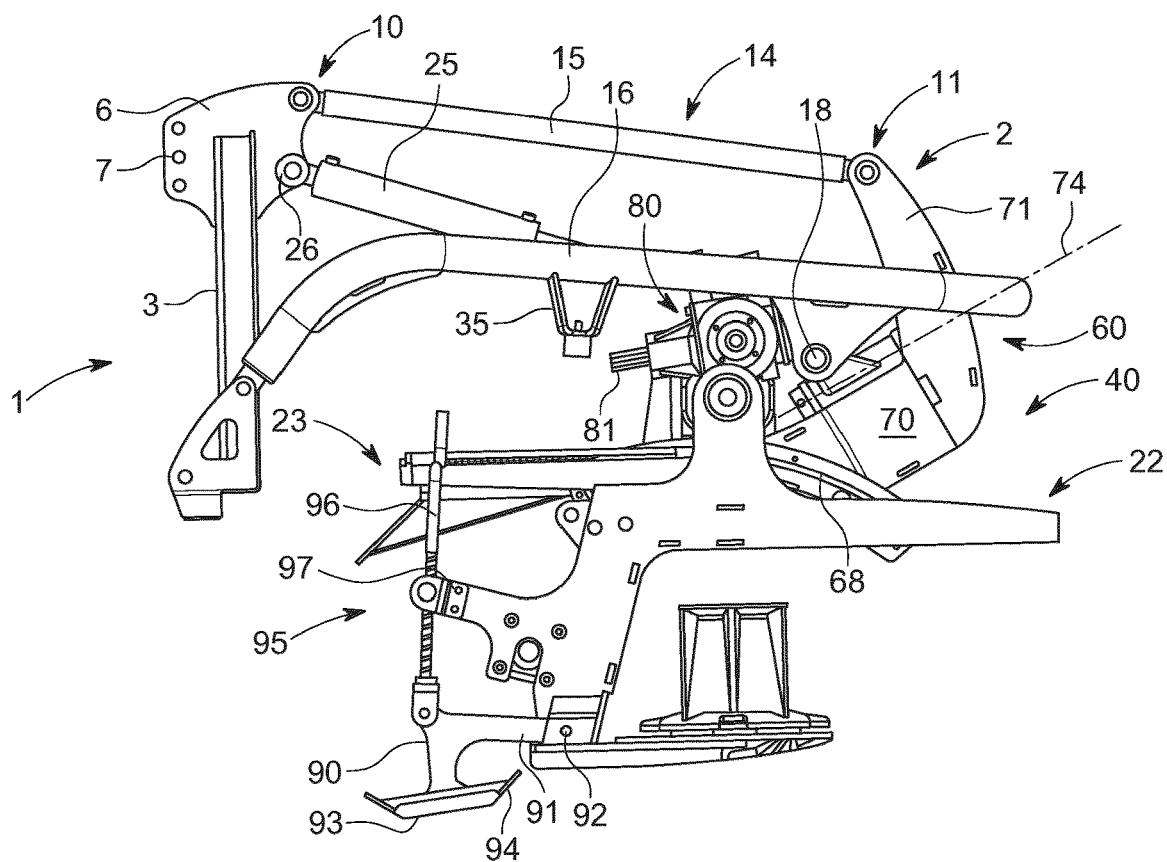
FIGS. 8 to 15 are side views of the front mower of FIG. 1 showing different positions of the mowing head relative to the headstock.

For the purposes of illustration of the front mower of the present invention, covers/skirts have been omitted in most of the drawings. This allows depiction of the mower bed etc. FIG. 6, for example shows a series of covers in place. In particular there are rear cover sections 43a and 43b; front cover sections 44a and 44b; and side cover sections though only one (labelled 45b) is shown—the other, on the opposite side, is not shown but it is a mirror image of it.

It will be appreciated that the cover sections of FIG. 6 can be applied to the front mower 1 shown in all drawings.

A mounting mechanism 60 mounts the mowing head 40 to the headstock 2.

As shown in the drawings the support 3 of the headstock 1 make take a triangular form.

An upper part 4 of the support 3, which may be an apex, has an upper connection point for an upper link of a three point linkage. In particular the upper part 4 of the support 3 may have a mounting bracket 6 with at least one pair of opposing apertures 7 through which a mounting pin may be inserted to connect the support 3 to an upper link of a three point linkage of a tractor.

A lower part 8 of the support 3, may have respective lower connection points for respective lower links of a three point linkage. In particular the lower part 8 of the support 3 may have respective mounting brackets 9 each with a pair of opposing lugs with apertures 10 through which a mounting pin may be inserted to connect the support 3 to respective lower links of a three point linkage of a tractor.

The headstock 1 may further comprise an upper linkage arm 15 that extends from the support 3. The headstock 1 may further comprise a lower linkage arm 16 that extends from the support 3. The upper linkage arm 15 may extend from the support 3 at a position above the lower linkage arm 16. The upper 15 and lower 16 linkage arms together connect the mounting mechanism 60 to the support 3.

The mowing head 40 comprises a cross frame member 46 and opposing side frame members 47a and 47b. The cross frame member 46 and the opposing side frame members 47a and 47b may be adapted to support cover sections as set out above. For example the respective side frame members 47a and 47b may have respective carrying arms 47c and 47d to which the covers are mounted (best seen from FIGS. 4 and 5).

The common carrier in the form of a cutting bed 42 is mounted to the lower ends 48a and 48b of the side frames 47a and 47b. The cutting bed 42 is generally parallel to the cross frame member 46.

The cutting heads 41 that are mounted on the cutting bed 42 are thus aligned generally parallel to the cross frame member 46. It will be appreciated that any cutting heads may be utilised and that the cutting heads are arranged to work together to cut a continuous stripe or swath.

The mounting mechanism 60 comprises a cutting angle adjustment mechanism 61 that comprises respective (opposing) arc shaped guides 62 and a follower 63 for each of the arc shaped guides. The respective followers 63 are moveable back and forth along the arc shaped guides, so that the cutting angle adjustment mechanism 62 allows the mowing head to move back and forth along an arc defined by the guides 62 and relative to the headstock so as to vary the cutting angle of the cutting heads 41. It will be appreciated that the cutting angle of the cutting heads relative to the mowing head itself can be set independently as is discussed in more detail below. The arc shaped guides 62 are arranged parallel to the direction of travel. The arc shaped guides 62 describe the travel/define the travel path of the mowing head for forward and rear tilting of the mowing head.

It is a free moving mechanism where the followers 63 are moveable freely back and forth along the arc shaped guides 62 in the sense that, because of the movement of the followers relative to the arc shaped guide, the mowing head 40 can move to change angle in response to changes in terrain. There are no positional controls (such as actuators e.g. automated actuators) that position the follower 63 relative to the arc shaped guides 62.

The arc shaped guides are fixedly attached to the mowing head 40.

It will be noted (best seen from FIGS. 6 and 7) that there are a pair of followers 63 in each arc shaped guide 62. The followers 63 are spaced apart and are arranged along an arc. The mounting mechanism 60 comprises at least one arc shaped channel 68 and the followers 63 may be rollers such as roller bearings that run within the guide 62 or arc shaped channel.

Figure 13:
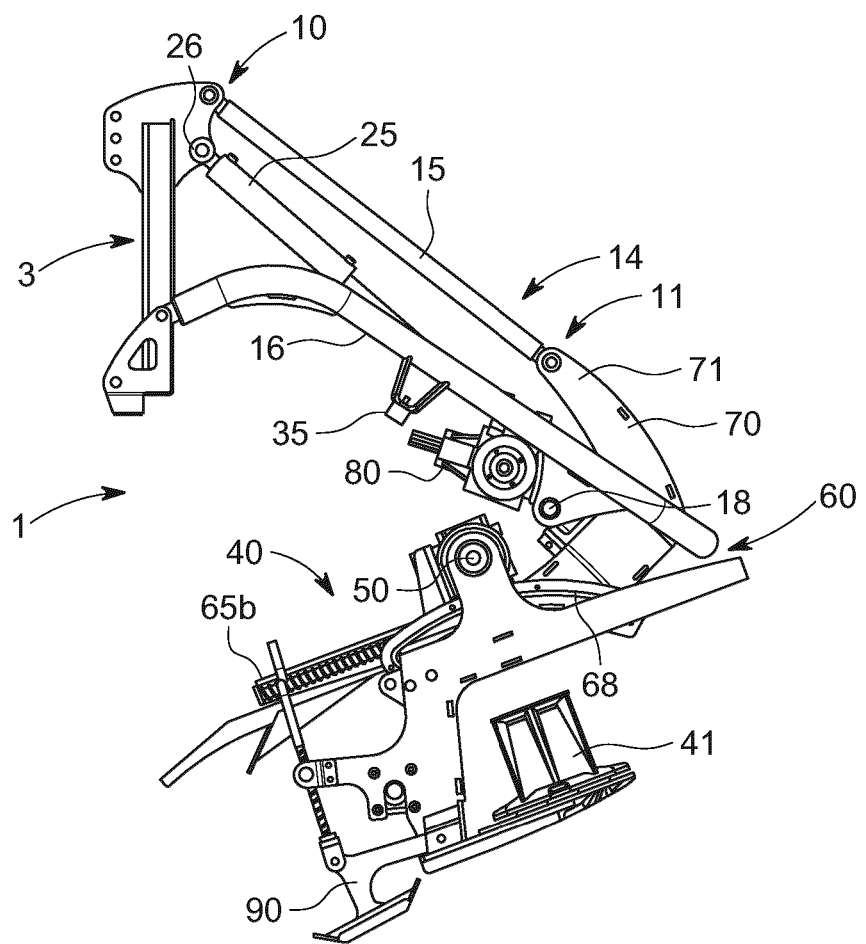

There is provided a biasing means 65a and 65b comprising respective compression springs 66a and 66b mounted about respective mounting rods 67a and 67b. The biasing means 65a,65b biases the mowing head 40 towards a predetermined position relative to the arc shaped guides 62—in this case a position where the cutting heads 41 (and indeed the entire mowing head 40) is tilted up relative to a horizontal plane. This position is best seen in FIG. 13. Tilted up in this respect refers to the front of the mower being tilted up relative to the horizontal plane.

Figure 9:
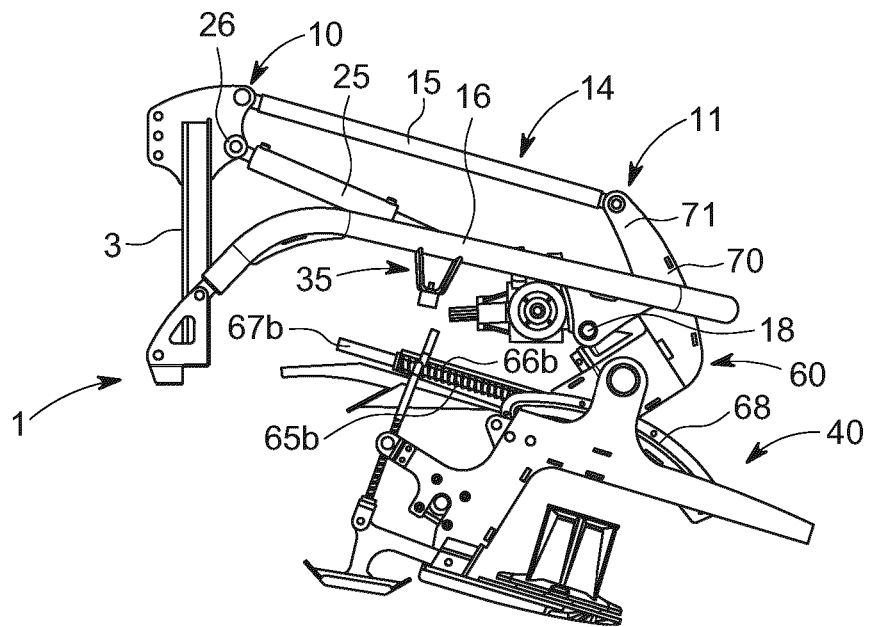
Figure 10:
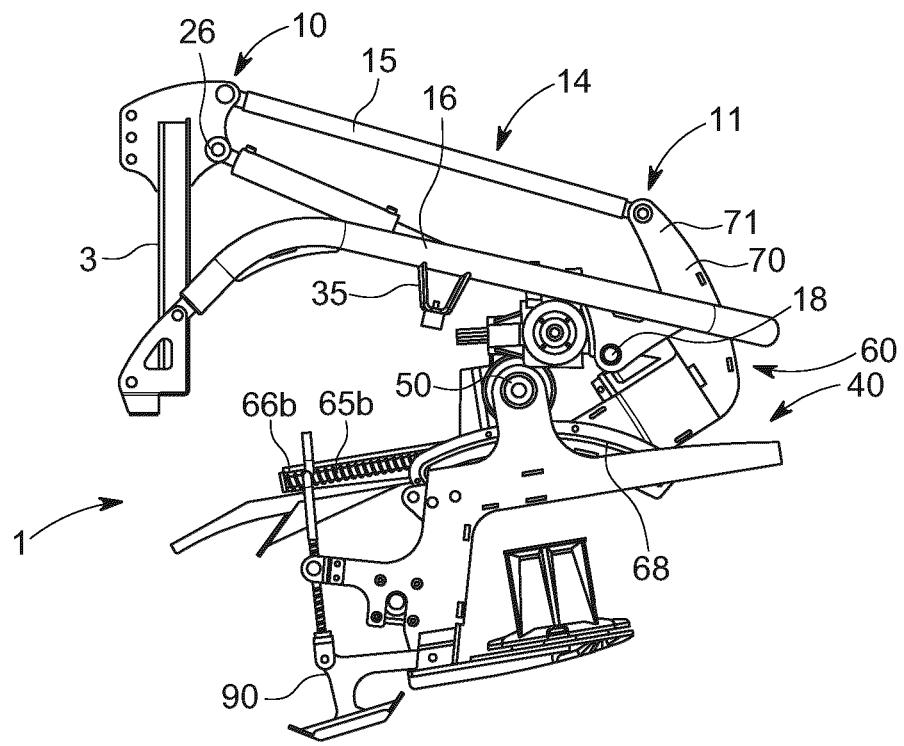
Figure 11:
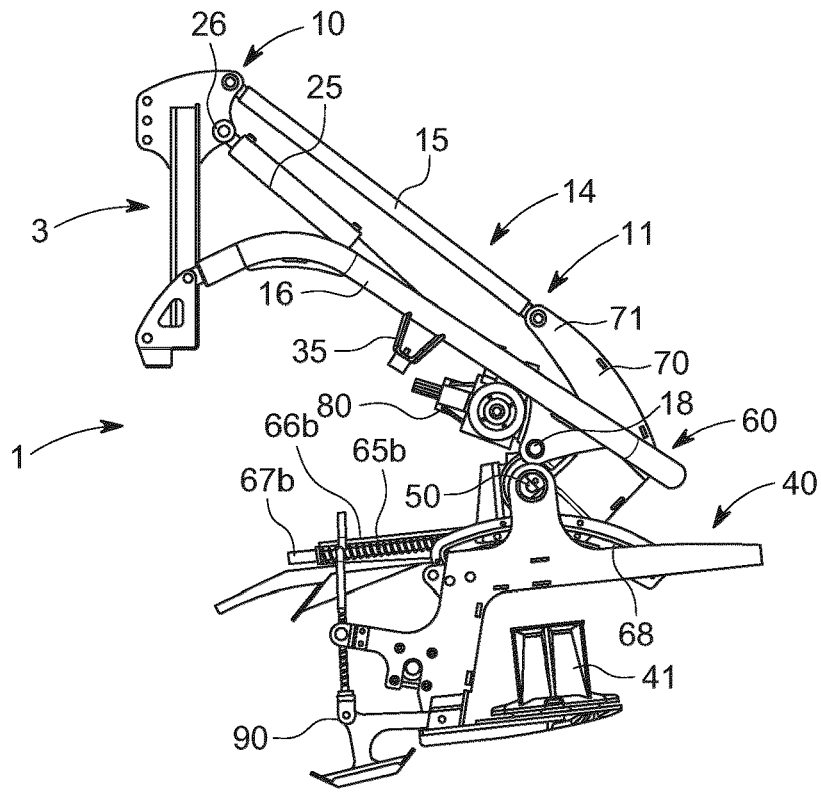
Figure 12:
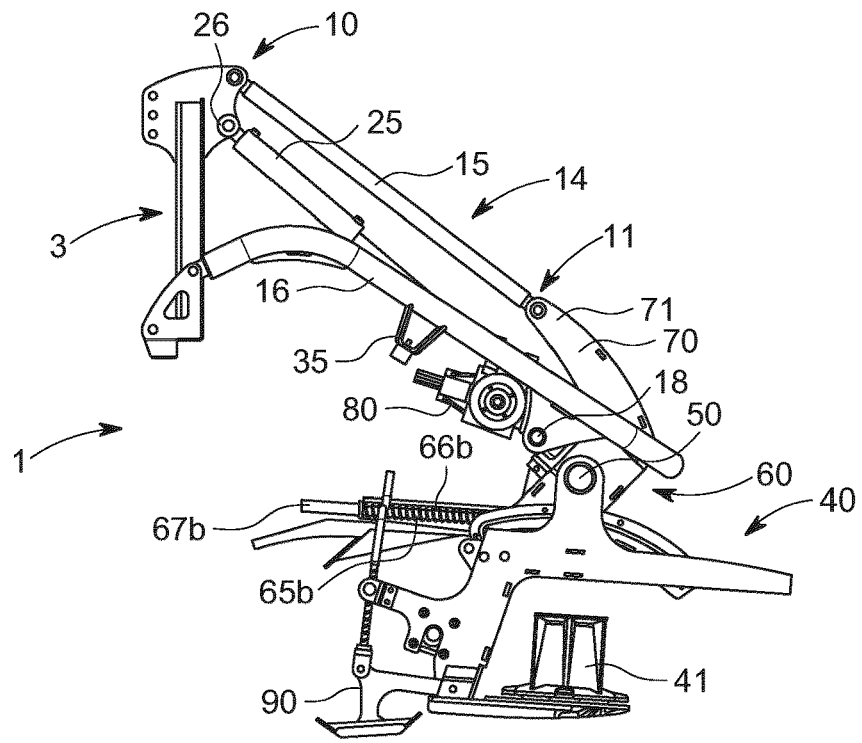
Figure 15:
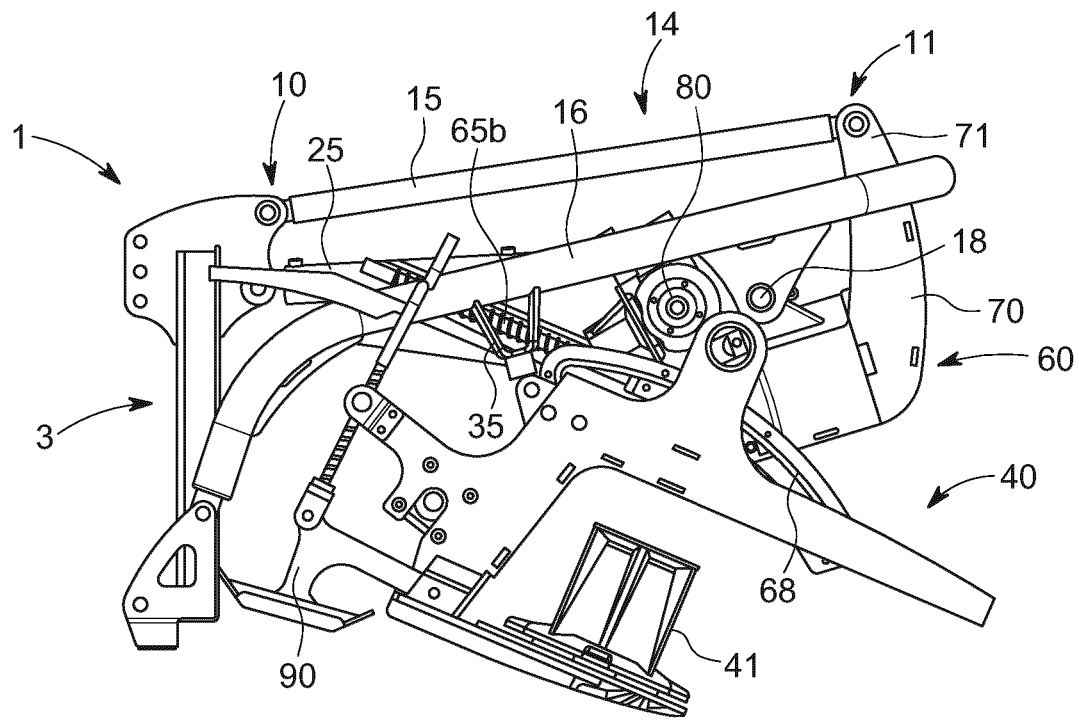

It will be appreciated that this arrangement allows for different front to rear tilted positions as seen from a comparison of the figures. For example in FIG. 8 the front 22 and rear 23 of mowing head 40 are both horizontal. In this respect the cutting heads 41 and the mower bed 42 is also horizontal. In FIGS. 9, 12 and 15 front to rear tilting has occurred with the front 40 of the mower head 40 being lowered with respect to the rear 41 of the mower head 40. (It will be appreciated that cutting heads 41 and the mower bed 42 have now also tilted front to rear so that the cutting angle is adjusted.) In FIGS. 10, 11 and 13 front to rear tilting has occurred with the front 22 of the mower head 40 being raised with respect to the rear 23 of the mower head 40. (Again cutting heads 41/mower bed 42 have now also tilted front to rear so that the cutting angle is adjusted.)

The biasing action of the biasing means 65a,65b does not prevent the movement of the followers 63 and thus the mowing head 40 relative to the arc shaped guides 62. This means that the followers 63 and thus the mowing head 40 are still free to follow the contours of the ground albeit that when the mowing head 40 is lifted clear of the ground it will be moved back to the tilted up position by the biasing means 65a,65b.

The biasing means 65a, 65b thus also act as a damper for the movement of the mowing head 40 relative to the ground.

The centre of curvature of the arc shaped guides 62 is coincident with or proximate to the cutting heads 41 so that back and forth movement along the arc shaped guides 62 is translated into a tilting motion of the cutting heads 41 about an axis through that centre of curvature.

The back and forth tilting of the mowing head 40 in response to the contours of the ground sweeps out an arc of movement that corresponds to the arc of the arc-shaped guides 62.

Desirably the headstock 2 includes a tilting mechanism 14 that allows side to side tilting of the mounting mechanism 60 thus allowing side to side tilting of the mowing head 40. The side to side tilting of the mowing head 40 is demonstrated by comparison of the position of the mowing head 40 in different figures.

In FIG. 1 the mowing head 40 is substantially horizontal with the left side 20 and the right side 21 of the mowing head 40 being horizontal. In this respect the cutting heads 41/mower bed 42 is also horizontal.

Figure 2:
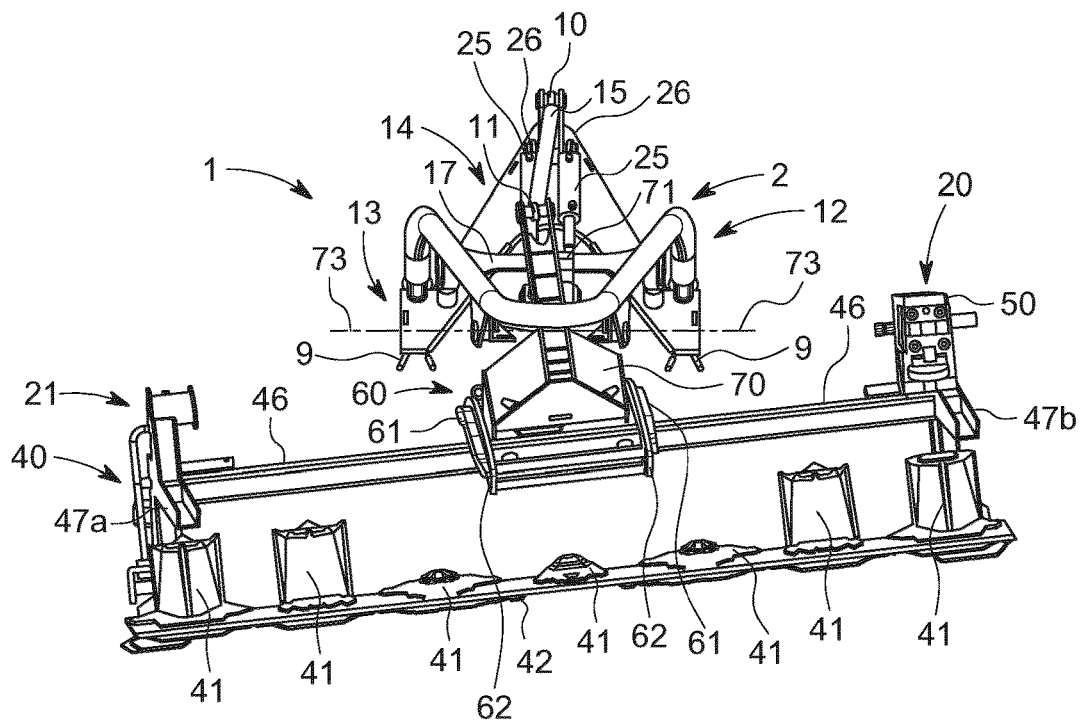
FIGS. 2 and 3 show a similar view to FIG. 1 showing side to side tilting of the mowing head of the front mower.

In FIG. 2 side to side tilting has occurred with the left side 20 of the mower head 40 being raised with respect to the right side 21 of the mower head 40. (It will be appreciated that cutting heads 41/mower bed 42 have now also tilted side to side.)

Figure 3:
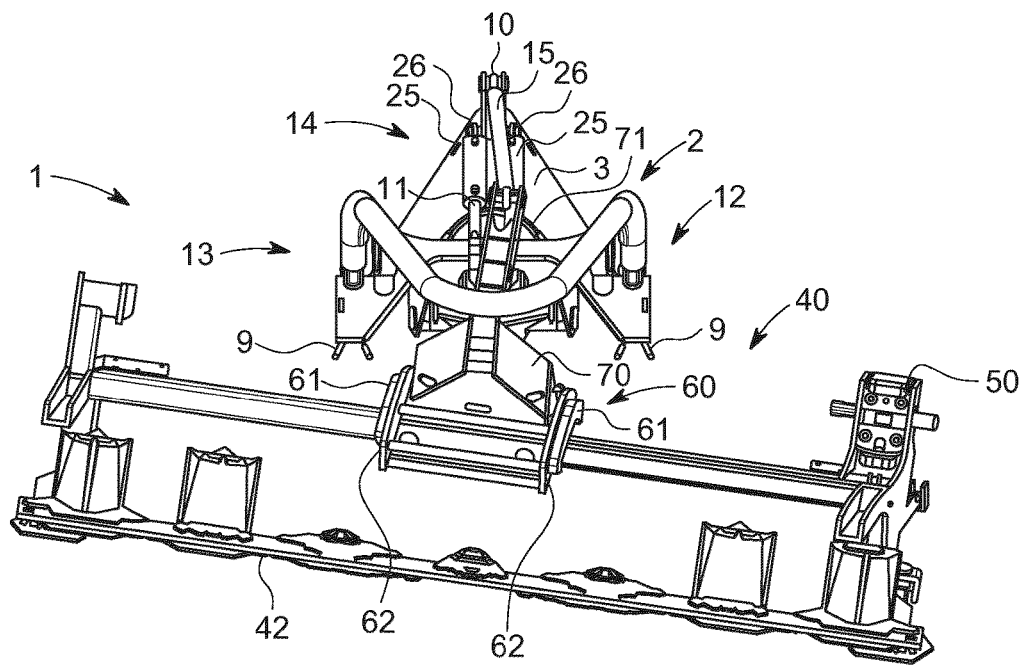
Figure 4:
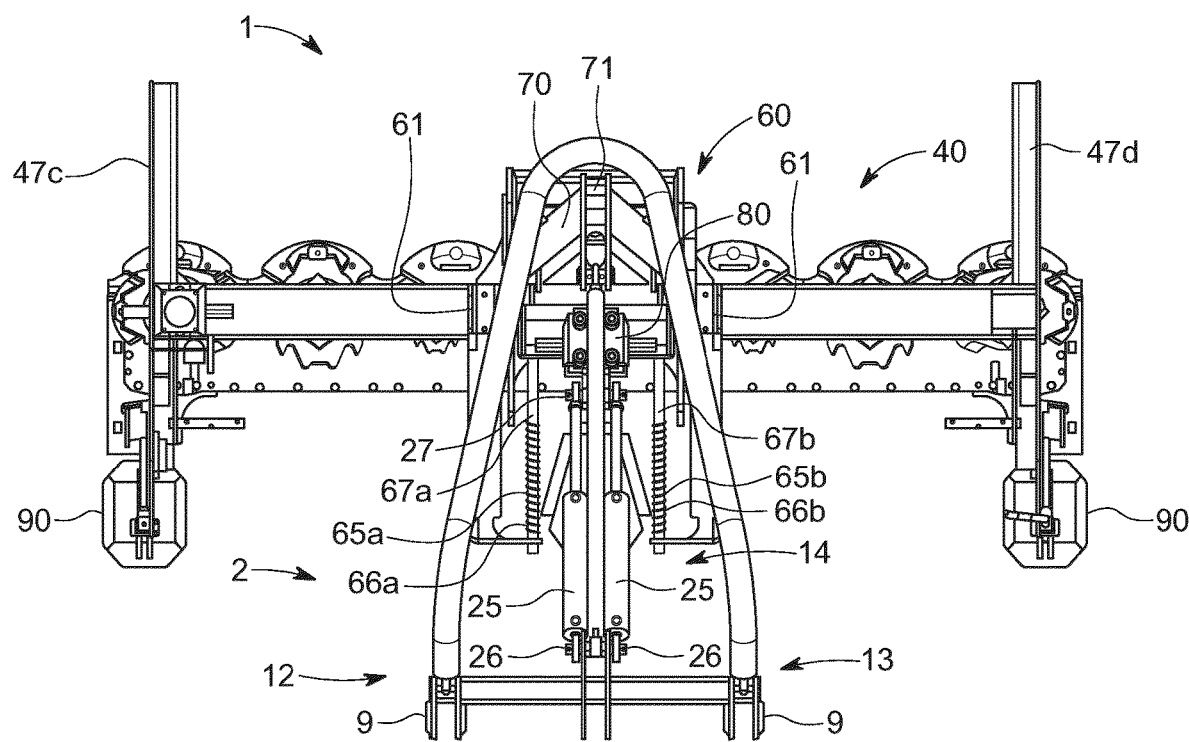
FIG. 4 is a rear view from above of the front mower of FIG. 1.
Figure 5:
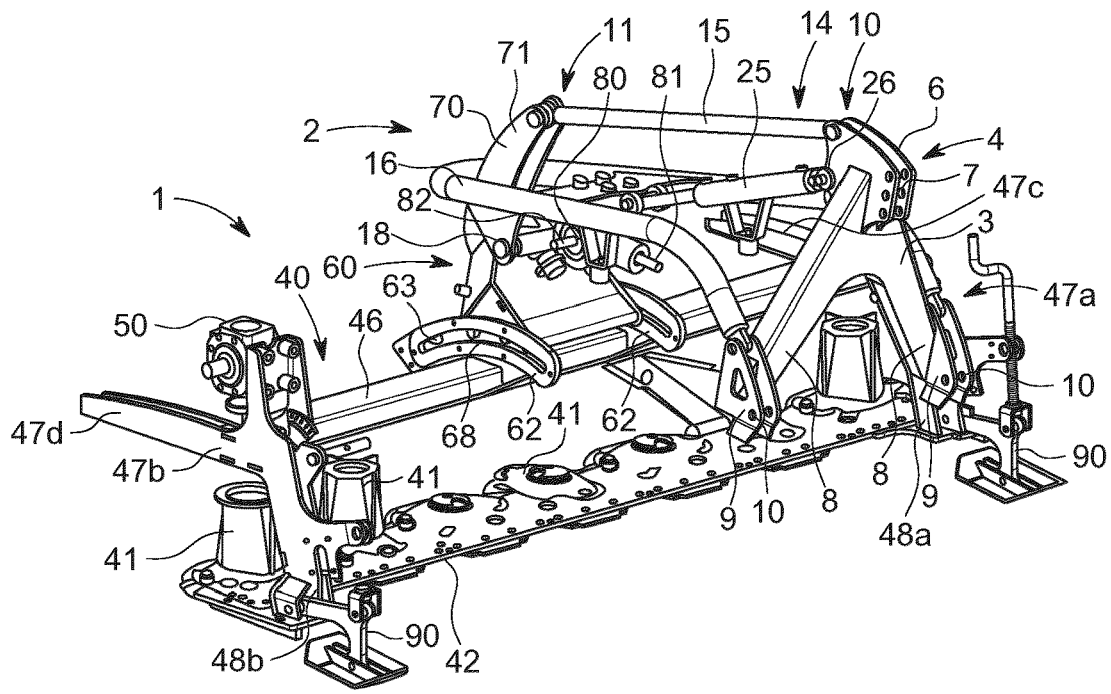
FIG. 5 is a rear perspective view of the front mower of FIG. 1.

In FIG. 3 side to side tilting has occurred with the right side 21 of the mower head 40 being raised with respect to the left side 20 of the mower head 40. (Again cutting heads 41/mower bed 42 have now also tilted side to side.)

It will be appreciated that this side to side tilting is independent of the front to rear tilting. Both can occur at the same time and independently of each other to follow contours of the ground.

The side to side tilting mechanism 14 balances the mowing head 40 at all tilt angles of side to side tilting so that the mowing head 40 will remain horizontal, or at a given tilt angle, unless an external force is applied.

The mounting mechanism 60 comprises a mounting bracket 70 that attaches the cutting angle adjustment mechanism 61 to the headstock 2.

The mounting bracket 70 is mounted by tilting mechanism 14 so as to accommodate this side to side tilting. The mounting bracket 70 has an upright portion 71 that extends upwards from the cutting angle adjustment mechanism 61. The mounting bracket 70 attaches the cutting angle adjustment mechanism 61 to both the lower linkage arm 16 and the upper linkage arm 17. The upper linkage arm 15 forms part of the tilting mechanism by moving in response to side to side tilting of the mounting mechanism 60.

The mounting bracket 70 is pivotally mounted and can tilt side to side. In particular the mounting bracket 70 can articulate side to side relative to the headstock 2. It can articulate side to side relative to both the lower linkage arm 16 and the upper linkage arm 17.

The upper linkage arm 15 is connected to the support 3 of the headstock by a pin and bracket coupling 10. The upper linkage arm 15 is connected to the mounting bracket 70 by a pin and bracket coupling 11. As best seen from a comparison of the position of upper linkage arm 15 in FIGS. 1, 2 and 3 the upper linkage arm 15 moves with mounting bracket 70 and with mower head 40 to accommodate side to side tilting as described above. In this way side to side tilting is accommodated within the headstock 2.

It will be appreciated that the lower linkage arm 16 is a continuous arm that connects to the support 3 (of the headstock 2) on a left hand side 12 thereof and extends forwardly away from the support 3 to a position where it is above the mowing head 40 and then returns to connect to the support 3 on a right hand side 13 thereof.

The lower linkage arm 16 is connected to a portion the mounting bracket 70 by a pin and bracket coupling 18. So this gives the mounting bracket 70 a first pivot axis 73 though the longitudinal axis of pin and bracket coupling 18. The mounting bracket 70 is also connected to a second pin and bracket coupling which is at right angles to the pin and bracket coupling 18 and this gives pivotal movement about an axis 74 (see FIG. 8). The two pivotal axes 73 and 74 together allow for movement of the mounting bracket 70 relative to the headstock 2. In particular side to side tilting of tilting mechanism 14 is accommodated in this way.

The front mower 1 has a transfer box 80 which has a splined drive shaft 81 for receiving a coupling for a tractor driven power take off (pto) shaft and two splined drive shaft 81 for receiving respective mower pto shafts for driving the cutting heads 42. The transfer box 80 transfers power from the coupling for the tractor pto shaft to the coupling for the mower pto shaft. In all the drawings the drive shafts are omitted to allow clearer depiction of the other workings of the mower 1.

The transfer box 80 may be mounted on the mounting bracket 70. Desirably it is carried on the lower linkage arm 16 as shown in the drawings, for example on a cross member 17 of the lower linkage arm 16.

The mower 1 further comprises at least one, and desirably as shown two adjustable skids 90 for running along the ground to follow the contours of the ground. Desirably the skids 90 are respectively on left 20 and right 21 sides of the mower head 40. As best seen from FIGS. 8 to 15 a forward end 91 of the skid is pivotably connected by a pin and bracket coupling 92 to the mowing head 40 proximate the mower bed 42. A skid plate 93 optionally with a raised nose plate 94 is arranged to run along the ground. The skid 90, in particular a skid plate 93 thereof, may have an increasing ground contact surface area from a forward end thereof toward a rearward end thereof.

A skid adjustment mechanism 95 is provided which adjusts the height of the skid 90 relative the mowing head 40. Any suitable adjustment mechanism can be used including an actuator such as a hydraulic cylinder or a jack such as jack 96 that is provided between the skid 90 and a bracket 97 on the mowing head 40. The jack 96 can be adjusted (e.g. by screw rotation) to increase or decrease the distance between the skid plate 93 and the bracket 97. This in turn sets the cutting angle of the cutting heads 41 relative to the ground by setting the angle of the mowing head relative to a horizontal plane. It will be appreciated that this is a fixed relative positioning. Of course the cutting angle adjustment mechanism 61 as described above still operates to follow the contours of the ground.

The skids 90 are thus adjustable to vary the cutting angle of the cutting heads 41.

Desirably a forward end of the skids 90 extends to a position beneath the cutting heads 41.

Raising and lowering of the mowing head 40 is achieved using hydraulic rams 25. The hydraulic rams 25 are connected to the support 3 of the headstock 2 by a pin and bracket coupling 26. They are also connected to a cross member 17 of the lower linkage arm 16 by a pin and bracket coupling 27. The headstock 2 incorporates a suspension that takes at least part of the weight of the mower head 40 and transfers it to the tractor. The suspension may be controlled by an electronic controller. Alternatively the suspension may be one that is part of the tractor.

A bump stop 35 is provided on the lower linkage arm 16 to provide a stop for against which the mowing head 40 can abut.

It will be appreciated that certain parts are omitted or not shown in full. For example a gear box 50 is provided on either side of the mowing head for transfer of power to the cutting heads 41.

In use, the front mower 1 is attached to the front linkage of a tractor. This is done by mounting the support 3 of the headstock 2 to the front linkage of the tractor in the conventional fashion. Hydraulic controls and a PTO shaft also connected to respectively ensure there is power for lifting and lowering the front mower and also for driving the cutting head. An electronic control box which may be positioned beside the operator of the tractor may be utilised to control the suspension of the front mower 1 to allow it to "float" as described above. Alternatively tractor electronic controls may be used.

The cutting angle of the cutting heads 41 can be adjusted by adjusting the adjustable skids 90 as described above. In essence this sets the cutting angle of the cutting heads 41 when the front mower 1 is in a horizontal position (i.e. relative to a horizontal plane). The cutting angle can determine how close to the ground the cutting blades 41 cut the crop in question.

The hydraulic controls of the tractor will allow the operator of the tractor to raise and lower the front mower 1 using the hydraulic rams 25. The PTO controls of the tractor will allow the operator of the tractor to power up and power down the cutting heads 41.

In use, the tractor is driven forward with the cutting heads 41 being powered by the tractor. As front mower 1 moves along the ground, the skids 90, in particular this skid plates 93, follow the contours of the ground. As the mower encounters contours, it can tilt side to side (as described above) and forward and back (again as described above) to follow the ground closely. For example, as the ground in front dips away, the front mower 1 will take an orientation as shown for example in FIG. 9. As the ground in front climbs, the front mower 1 will take the orientation shown for example in FIG. 10.

Figure 14:
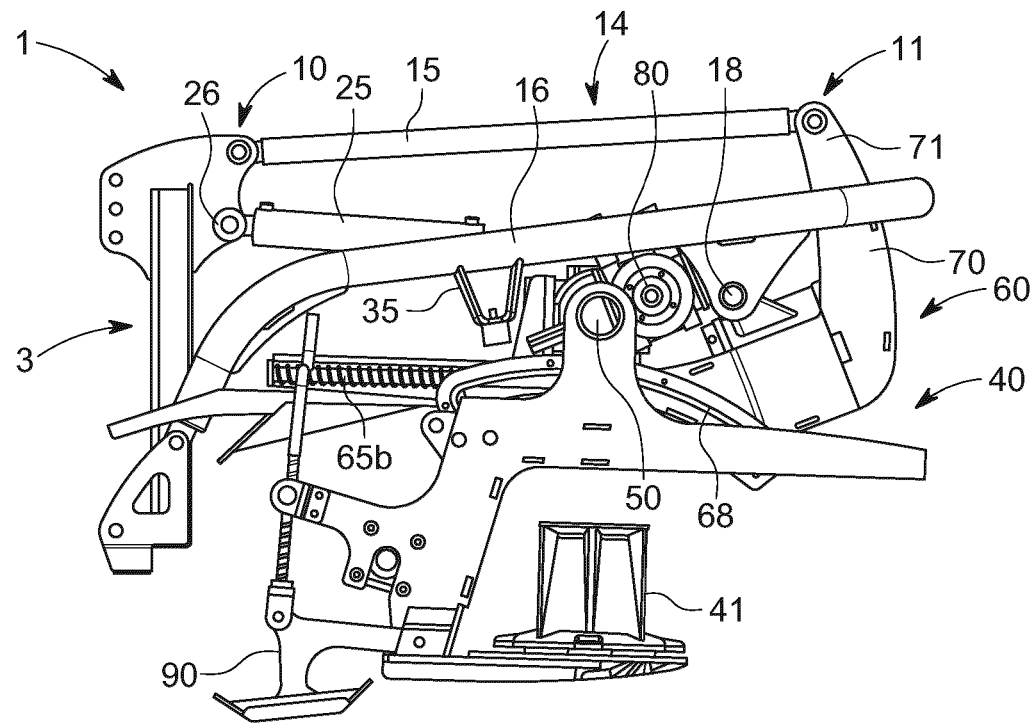

When the front mower 1 is raised clear of the ground, because of the biasing action of the biasing means 65*a*,65*b* it will be biased back to the position shown in FIG. 14.

The present invention thus provides a simple but very practical front mower that is versatile in its movement and can adapt to follow the contours of the ground over which it passes.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A front mower for mounting on a front three point linkage of a tractor to be operated for cutting vegetation, such as grass, in front of the tractor, the mower comprising:
   (a) a headstock for mounting on the front three point linkage of the tractor;
   (b) a mowing head comprising an array of cutting heads for cutting vegetation such as grass, mounted on and moveable relative to the headstock to follow the contours of the ground over which the mower is passing;
   (c) a mounting mechanism mounting the mowing head to the headstock, wherein the mounting mechanism comprises a cutting angle adjustment mechanism comprising an arc shaped guide and a follower for the arc shaped guide, the follower being moveable back and forth along the arc shaped guide, so that the cutting angle adjustment mechanism allows the mowing head to move back and forth along an arc defined by the guide and relative to the headstock so as to vary the cutting angle of the cutting heads.

2. A front mower according to claim 1 further comprising biasing means for biasing the mowing head towards a predetermined position along the arc shaped guide for example a position where the cutting heads are tilted up relative to a horizontal plane.

3. A front mower according to claim 1 wherein a centre of curvature of the arc is coincident with or proximate to the cutting heads so that back and forth movement along the arc is translated into a tilting motion of the cutting heads about an axis through the centre of curvature.

4. A front mower according to claim 3 wherein the centre of curvature of the arc is below the cutting heads so that the back and forth movement along the arc is translated into a tilting motion of the cutting heads about an axis through the centre of curvature.

5. A front mower according to claim 1 wherein the headstock includes a tilting mechanism that allows side to side tilting of the mounting mechanism thus allowing side to side tilting of the mowing head.

6. A front mower according to claim 5 wherein the tilting mechanism balances the mowing head at all tilt angles of the side to side tilting so that the mowing head remains at a given tilt angle.

7. A front mower according to claim 1 wherein the headstock comprises a support that connects to, and when connected is fixed relative to, the three point linkage of the tractor, and the headstock further comprises:
   (a) an upper linkage arm that extends from the support;
   (b) a lower linkage arm that extends from the support;
   the upper linkage arm extending from the support at a position above the lower linkage arm, and wherein the upper and lower linkage arms together connect the mounting mechanism to the support.

8. A front mower according to claim 7 wherein the upper linkage arm forms part of the tilting mechanism by moving in response to side to side tilting of the mounting mechanism.

9. A front mower according to claim 1 wherein the mounting mechanism comprises a mounting bracket that attaches the cutting angle adjustment mechanism to the headstock.

10. A front mower according to claim 8 wherein the mounting mechanism comprises a mounting bracket that extends upwards from the cutting angle adjustment mechanism and attaches the cutting angle adjustment mechanism to both the lower linkage arm and the upper linkage arm.

11. A front mower according to claim 10 wherein the mounting bracket is connected to the lower linkage arm so as to allow side to side tilting of the mowing head and is connected to the upper linkage arm so as to allow side to side tilting of the mowing head.

12. A front mower according to claim 7 wherein the lower linkage arm is a continuous arm that connects to the support on a left hand side and extends forwardly away from the support to a position where it is above the mowing head and then returns to connect to the support on a right hand side thereof.

13. A front mower according to claim 1 further comprising a transfer box which has a coupling for a tractor power take off (pto) shaft and a coupling for at least one mower pto shaft for driving the cutting heads and the transfer box transfers power from the coupling for the tractor pto shaft to the coupling for the at least one mower pto shaft.

14. A front mower according to claim 13 wherein:
   the mounting mechanism comprises a mounting bracket that attaches the cutting angle adjustment mechanism to the headstock; the mower further comprises a transfer box which has a coupling for a tractor power take off (pto) shaft and a coupling for at least one mower pto shaft for driving the cutting heads and the transfer box transfers power from the coupling for the tractor pto shaft to the coupling for the mower pto shaft; and
   further wherein the transfer box is mounted on the mounting bracket.

15. A front mower according to claim 13 further comprising a transfer box which has a coupling for a tractor power take off (pto) shaft and a coupling for at least one mower pto shaft for driving the cutting heads and the transfer box transfers power from the coupling for the tractor pto shaft to the coupling for the mower pto shaft and further wherein the lower linkage arm carries the transfer box.

16. A front mower according to claim 1 wherein the mounting mechanism comprises at least one arc shaped guide and at least one roller that runs within the guide, or the mounting mechanism comprises at least one arc shaped guide and at least two rollers that run within the guide.

17. A front mower according to claim 1 further comprising at least one adjustable skid for running along the ground to follow the contours of the ground.

18. A front mower according to claim 17 wherein a forward end of the skid is pivotably connected to the mowing head.

19. A front mower according to claim 17 wherein the skid is adjustable to vary the cutting angle of the cutting heads, or wherein the forward end of the skid extends to a position beneath the cutting heads.

20. A front mower according to claim 1 wherein the headstock incorporates a suspension that takes at least part of a weight of the mower and transfers it to the tractor.

* * * * *